United States Patent [19]

Takei

[11] Patent Number: 5,353,058

[45] Date of Patent: Oct. 4, 1994

[54] AUTOMATIC EXPOSURE CONTROL APPARATUS

[75] Inventor: Hirofumi Takei, Yokohama, Japan

[73] Assignee: Canon Kabushiki Kaisha, Tokyo, Japan

[21] Appl. No.: 927,739

[22] Filed: Aug. 12, 1992

Related U.S. Application Data

[63] Continuation of Ser. No. 783,351, Oct. 28, 1991, abandoned.

[30] Foreign Application Priority Data

Oct. 31, 1990 [JP] Japan .................................. 2-291816

[51] Int. Cl.⁵ .......................................... H04N 5/238
[52] U.S. Cl. .................................... 348/363; 348/362
[58] Field of Search ................. 358/41, 228, 29 C, 55; 348/362, 364, 242, 363

[56] References Cited

U.S. PATENT DOCUMENTS

| | | | |
|---|---|---|---|
| 4,987,482 | 6/1991 | Imai et al. | 358/55 |
| 5,049,983 | 9/1991 | Matsumoto | 358/44 |
| 5,065,247 | 11/1991 | Haruki | 358/228 |
| 5,065,248 | 11/1991 | Homma | 358/228 |

*Primary Examiner*—Alvin E. Oberley
*Assistant Examiner*—Minsun Oh
*Attorney, Agent, or Firm*—Fitzpatrick, Cella, Harper & Scinto

[57] ABSTRACT

Disclosed is an automatic exposure control apparatus so adapted that a photographic subject such as a human being can be photographed appropriately even if the subject is backlighted or excessively front-lighted. The control apparatus divides a frame into a plurality of areas and detects the backlighted state or excessively front-lighted state based upon the luminance of each of these areas. In case of backlighting or excessive front-lighting, an exposure correction of the entire frame is performed in conformity with the luminance of an area in which a flesh color is present in the vicinity of the center of the frame.

45 Claims, 11 Drawing Sheets

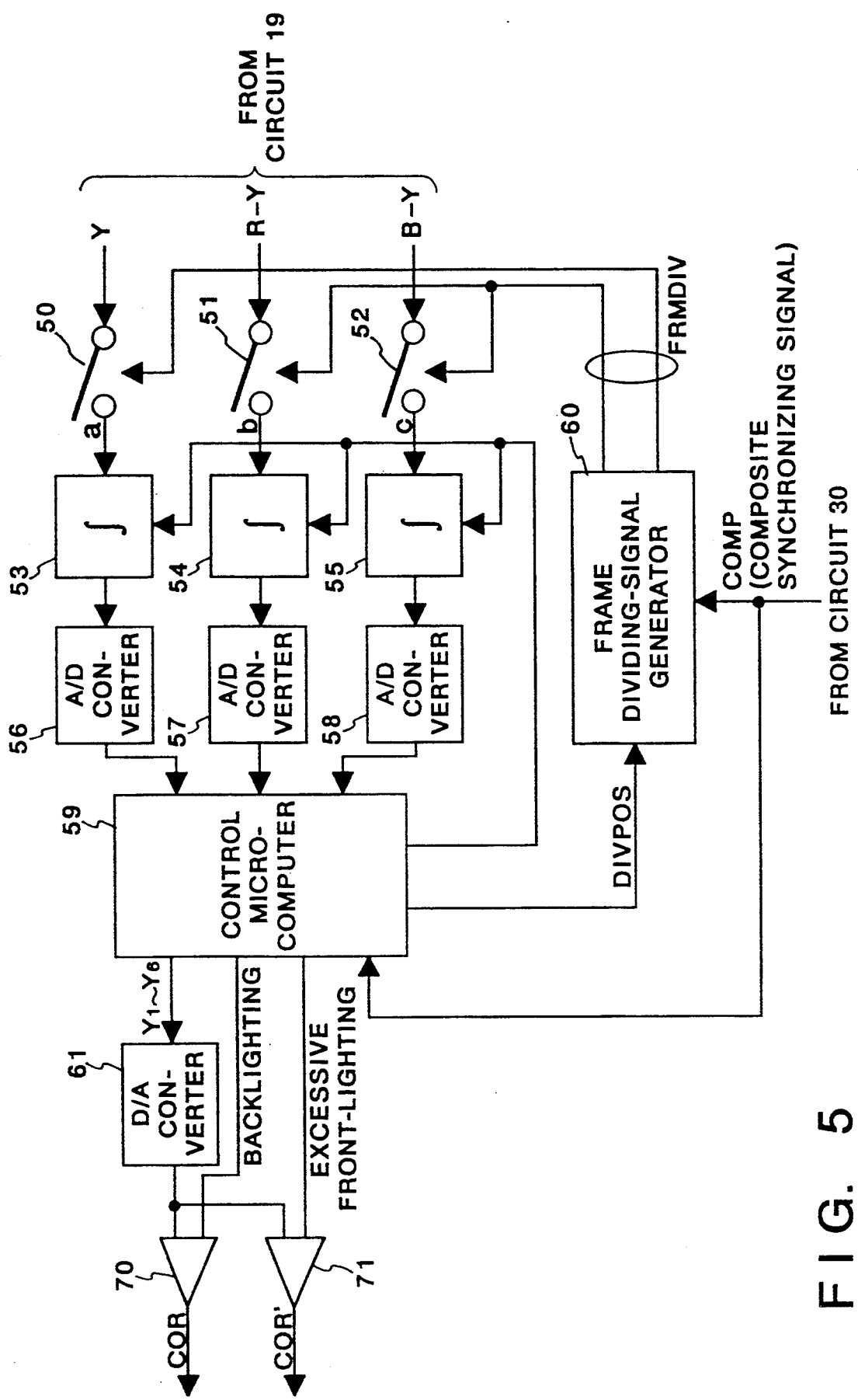
F I G. 5

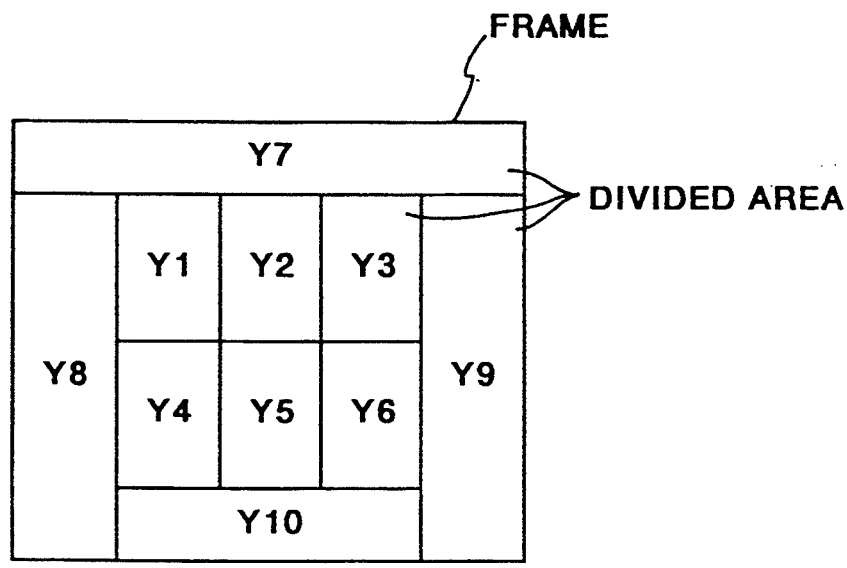
F I G. 6A
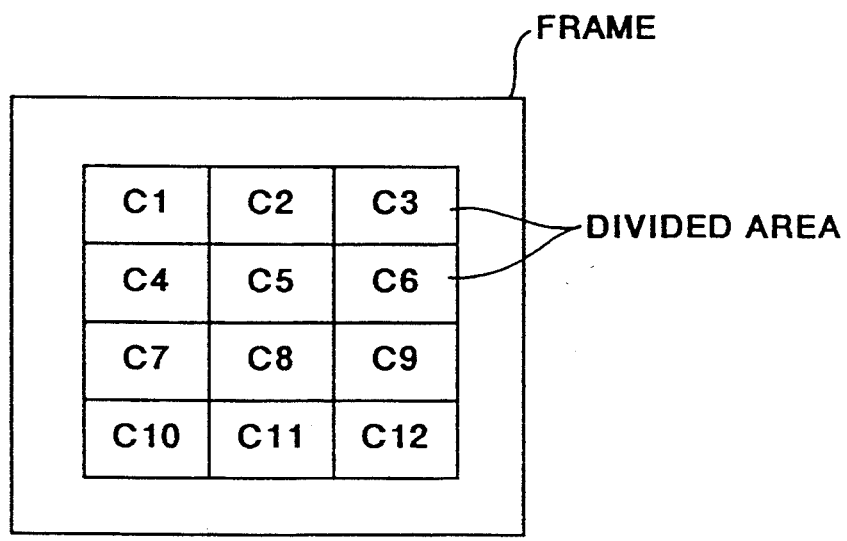
F I G. 6B

AUTOMATIC EXPOSURE CONTROL APPARATUS

This application is a continuation of application Ser. No. 07/783,351 filed Oct. 28, 1991, now abandoned.

BACKGROUND OF THE INVENTION

This invention relates to an automatic exposure control apparatus for obtaining ideal exposure using a video camera, by way of example.

A video camera or the like conventionally is provided with an automatic exposure control apparatus for maintaining exposure in an ideal state at all times.

In such an automatic exposure control apparatus, the diaphragm of an optical system and the level of a video signal usually are controlled in such a manner that the output video signal level remains constant. Conventionally, a circuit which performs averaging with regard to the entirety of one frame is used as a photometer circuit for controlling the diaphragm of the optical system and the video signal level. However, when the difference in luminance between the subject and the background is great, the subject appears too dark or black if the scene is backlighted and too bright or devoid of color if the scene is front-lighted. The result is an unnatural picture in either case.

In order to prevent the foregoing problem, a system has been proposed in which photometry is directed preferentially to a portion of the picture, e.g., the central portion (usually within a rectangular area) where the subject has a high probability of being located. Since the position of the photometric area is fixed within the picture, this method of photometry is referred to as fixed-area preferential photometry.

FIG. 1 is a block diagram showing the construction of the conventional automatic exposure control apparatus, which employs fixed-area preferential photometry, in an ordinary video camera. The apparatus includes an image pick-up optical system 10, a diaphragm 12 for regulating the quantity of incident light, an image sensor 14, a buffer amplifier 16, an automatic gain control (AGC) circuit 18, a photometer circuit 20 for controlling the diaphragm 12, a diaphragm drive circuit 22 for driving the diaphragm 12 in accordance with the output of the photometer circuit 20, a photometer circuit 24 for controlling the gain of the AGC circuit 18, a photometric area generating circuit 26 for outputting an area signal which designates the photometric areas of the photometer circuits 20, 24, a video-signal output terminal 28, and an input terminal 30 for a composite synchronizing signal.

The photometer circuit 20 controls the diaphragm 12 via the diaphragm drive circuit 22 in such a manner that the output level of the image sensor 14 is rendered constant. The photometer circuit 24 controls the gain of the AGC circuit 18 in such a manner that the output signal level of the AGC circuit 18 is rendered constant.

FIG. 2 illustrates one example of the construction of the photometer circuit 20. The photometer circuit 24 has a construction identical with that shown in FIG. 2. As shown in FIG. 2, the photometer circuit 20 includes an analog switch 31, low-pass filters (LPF) 32, 34, resistors 36, 38, and a buffer amplifier 40.

The output video signal from the buffer amplifier 16 is applied to the LPF 32 directly and to the LPF 34 via the analog switch 31. The analog switch 31 is opened and closed under the control of the area signal outputted by the photometric area generating circuit 26. The portion of the switch 31 corresponding to the photometric area of the video signal is placed in the closed state so that this portion of the video signal is delivered to the LPF 34.

More specifically, the LPF 32 outputs an average signal indicative of the average of the entire frame, and the LPF outputs an average signal indicative of the portion of the frame within the photometric area. These average signals are added together upon being weighted by the resistors 36, 38, respectively, and the sum is outputted by the buffer amplifier 40.

If the settings of the resistors 36, 38 are controlled to enlarge the weighting of the output from the LPF 32, photometry will approach that for the average of the entire frame. Conversely, if the resistance settings are controlled to enlarge the weighting of the output from the LPF 34, photometry will approach that which stresses the picture within the photometric area.

With fixed-area photometry according to the example of the prior art described above, certain problems are encountered.

Specifically, when photography is performed outdoors, a backlighted state in which the sky enters at the top of the picture often occurs. In such case, when preferential photometry is applied to the subject and it is attempted to avoid excessive darkening of the subject, it is desired that the preferential photometric area fall within the subject, as illustrated in FIG. 3A. However, if the subject is a person wearing clothing (such as a black suit or coat) having a low level of luminance, as shown in FIG. 3B, the dark clothing enters the photometric area and therefore the average luminance declines. Since control of the diaphragm is performed in accordance with the average luminance, the face of the person serving as the subject becomes to bright and colorless.

Even if the clothing worn is not dark, as shown in FIG. 3C, average luminance will decline and the person's face will appear too bright if the only the face is bright (as when the person is in a spotlight).

SUMMARY OF THE INVENTION

Accordingly, an object of the present invention is to provide an automatic exposure control apparatus capable of performing appropriate exposure control conforming to the photographic condition of the subject.

Another object of the present invention is to provide an automatic exposure control apparatus capable of performing appropriate exposure control conforming to the photographic condition of the subject by detecting and evaluating the level of the luminance component and the level of the chromaticity component in a video signal in each of a plurality of divided areas set within a picture, and discriminating the photographic condition of the subject based upon the evaluation.

Still another object of the present invention is to provide an automatic exposure control apparatus capable of performing appropriate exposure control conforming to the photographic condition of the subject by retrieving one divided area, which has a chromaticity component of a predetermined level, from among the plurality of divided areas, and correcting a photometric control signal using the luminance level of the retrieved divided area as the brightness of the subject.

A further object of the present invention is to provide an automatic exposure control apparatus capable of performing appropriate exposure control conforming to the photographic condition of the subject by evaluating the lighting of the subject to determine at least whether it is in an ordinary state or not, evaluating the subject to determine whether it possesses a portion having a specific color, and discriminating the photographic state of the subject based upon the evaluation information.

Yet another object of the present invention is to provide an automatic exposure control apparatus capable of performing appropriate exposure control conforming to the photographic condition of the subject by distinguishing between and sensing a backlighted state and an excessively front-lighted state.

Yet another object of the present invention is to provide an automatic exposure control apparatus capable of performing appropriate exposure control conforming to the photographic condition of the subject by detecting the level of the luminance component in a subject area of an imaged scene and in a peripheral area of the subject area based upon a distribution of levels of luminance components in a video signal, and evaluating the lighting of the subject using difference information and ratio information indicative of the difference between and the ratio of the level of the luminance component in the subject area and the level of the luminance component in the peripheral area.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a block diagram showing the construction of an exposure correcting circuit in FIG. 4;

FIGS. 6A and 6B are diagrams for describing divided areas of luminance signals and divided areas of chromaticity signals applied in the apparatus of the embodiment;

DESCRIPTION OF THE PREFERRED EMBODIMENT

A preferred embodiment of the present invention will now be described in detail with reference to the drawings.

Figure 1:
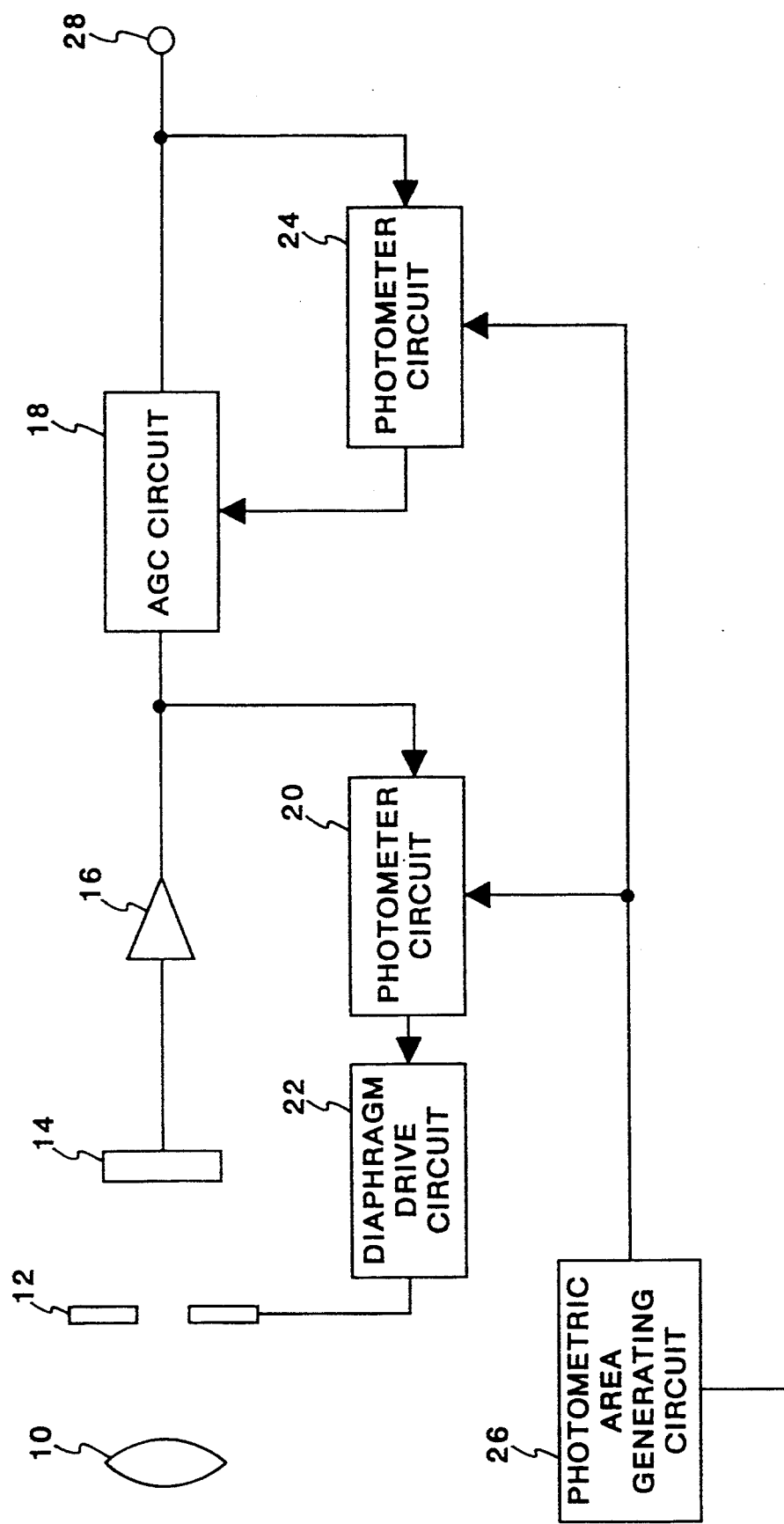
FIG. 1 is a block diagram showing an example of an ordinary automatic exposure control apparatus.
Figure 4:
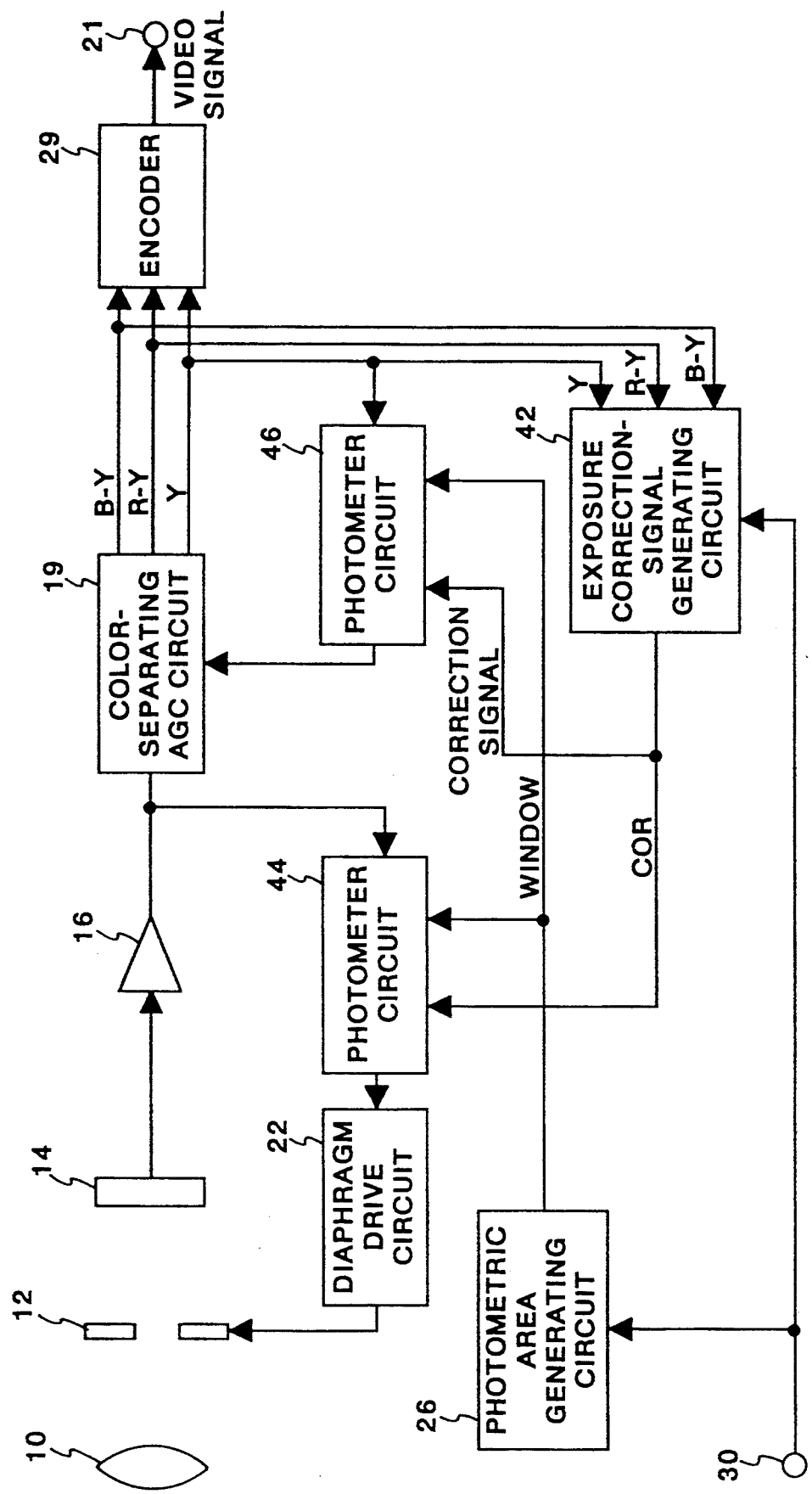
FIG. 4 block diagram showing an embodiment of an automatic exposure control apparatus according to the present invention.

FIG. 4 is a block diagram illustrating the construction of an automatic exposure control apparatus embodying the present invention. Portions similar to those of the conventional control apparatus shown in FIG. 1 are designated by like reference characters and need not be described again.

As shown in FIG. 4, an exposure correction-signal generating circuit 42 generates a correction signal upon discriminating the condition of the picture, such as whether it is backlighted or excessively front-lighted. In accordance with a composite synchronizing signal, the signal generating circuit 42 divides the imaged frame into a plurality of areas, essentially follows the position of the subject in the imaged frame based upon luminance information and chromaticity information in each area, accurately detects the luminance information and chromaticity information at each position of the subject, and performs prescribed arithmetic processing to generate the correction signal.

The photometric area generating circuit 26 generates a photometric area signal WINDOW in order to set a fixed photometric area on the imaged frame. A photometer circuit 44 performs photometry, based upon the output level of the buffer amplifier 16, in accordance with the photometric area signal outputted by the photometric area generating circuit 26 and the correction signal outputted by the exposure correction-signal generating circuit 42, and controls the diaphragm drive circuit 22 based upon the results of photometry, in the same manner as the photometer circuit 20 shown in FIG. 1. A color-separating AGC circuit 19 separates color-difference signals R-Y, B-Y and a luminance signal Y from the output signal of the buffer amplifier 16, and performs automatic gain control. A photometer circuit 46, which has a construction substantially the same as that of the photometer circuit 44, performs photometry based upon the output level of the luminance signal Y from the color-separating AGC circuit 19. The latter is connected to an output encoder 29, which outputs a standard television signal.

The operation of the automatic exposure control apparatus shown in FIG. 4 will be described next.

Light from a subject is incident upon the image pickup optical system 10, the amount of light is limited by the diaphragm 12, and the light from the diaphragm 12 is imaged on the imaging surface of the image sensor 14. The output of the image sensor 14 is applied to the color-separating AGC circuit 19 and photometer circuit 44 via the buffer amplifier 16. Each output of the color-separating AGC circuit 19 is supplied to the encoder 29.

The luminance signal output Y from the color-separating AGC circuit 19 is applied also to the photometer circuit 46 and the exposure correction-signal generating circuit 42. Also applied to the circuit 42 are the color-difference signal outputs R-Y, B-Y from the color-separating AGC circuit 19.

The photometer circuits 44, 46 detect the levels of the input luminance signals based upon the photometric area signal from the photometric area generating circuit 26 and the correction signal from the exposure correction-signal generating circuit 42. The photometer circuit 44 controls the aperture size of the diaphragm 12 via the diaphragm drive circuit 22, and the photometer circuit 46 controls the gain of the color-separating AGC circuit 19. As a result, the video signal level is held constant. Though there are cases where a so-called g processing circuit is connected between the buffer amplifier 16 and the color-separating AGC circuit 19, the signal level generally is controlled by the aforementioned regulation of the diaphragm and the AGC control loop.

The detailed construction of the exposure correction-signal generating circuit 42 is shown in FIG. 5. As shown, the luminance signal Y outputted by the color-separating AGC circuit 19 is applied to an integrating circuit 53 via a gate switch 50. An A/D converter 56 converts the integrated output of the integrating circuit 53 into a digital value and supplies the digital value to a microcomputer 59 for control. The latter reads in the output of the A/D converter 56 every field (every frame) and resets the integrating circuit 53 at a period equivalent to one field.

Similarly, the color-difference signals R-Y, B-Y from the color-separating AGC circuit 19 are applied to integrating circuits 54, 55 via gate switches 51, 52, respectively. A/D converters 57, 58 convert the integrated outputs of the respective integrating circuits 54, 55 into digital values and supplies these digital values to the control microcomputer 59. The latter reads in the outputs of the A/D converters 57, 58 every field and resets the integrating circuits 54, 55 at a period equivalent to one field.

The control operation of the control microcomputer will now be described in brief.

In order to divide a frame into a plurality of areas, the control microcomputer 59 applies a signal (a divided-position signal DIVPOS) indicative of the divided position to a frame-dividing signal generating circuit 60. The latter generates a frame-dividing signal FRMDIV, which controls the switching operation of the gate switches 50, 51, 52 from the divided-position signal DIVPOS and the composite synchronizing signal of the video signal which enters from input terminal 30.

In response to the signal FRMDIV, the switches 50, 51, 52 are closed, thereby being connected to respective contacts, a, b, c, with regard to portions corresponding to the divided areas in the luminance signal Y, color-difference signal R-Y and color-difference signal B-Y, respectively, and are opened, thereby being disconnected from the contacts a,b, c, with regard to portions corresponding the region outside the divided areas. As a result, the integrating circuits 53, 54, 55 are capable of integrating only the signal components corresponding to the interior of the divided areas. More specifically, the FRMDIV signal, by being applied to the switch 50, divides the frame into ten areas Y1–Y10, as shown in FIG. 6A. Further, by being applied to the switches 51, 52, the signal FRMDIV divides the frame into 12 areas C1–C12, as shown in FIG. 6B.

Based upon the integration information indicative of each divided area, the control microcomputer 59 discriminates whether the frame is backlighted state or excessively front-lighted, and outputs exposure-correction data COR to a D/A converter 61.

Frame Division

The operation for dividing a frame into a plurality of areas by the frame-dividing signal FRMDIV will be described with reference to FIGS. 6A, 6B. FIG. 6A is for describing a technique for dividing the frame into ten areas, evaluating the luminance level (integrated value) of each divided area, and discriminating the state of the frame.

The luminance signal Y is divided field by field in the order of the numbers shown in FIG. 6A. Here divided areas Y7, Y8, Y9, Y10 are areas peripheral to the subject, and therefore the average value of the luminance-signal levels of these areas is used as the luminance level of the periphery of the subject. The microcomputer 59 outputs any one of the divided areas Y1, Y2, Y3, Y4, Y5, Y6, which are in the vicinity of the central portion of the frame, to the D/A converter 61 as the luminance level of the subject. Since this selected luminance signal serves as the basis of the correction signal for photographing the subject at the appropriate exposure level, it will be referred to as the "representative luminance" hereinafter.

FIG. 6B is for describing a technique for dividing the frame into 12 areas C1–C12, and evaluating the chromaticity levels R-Y, B-Y (integrated values) of each divided area, thereby discriminating the state of the frame. The color-difference signals R-Y, B-Y are divided field by field in the order of the numbers shown in FIG. 6B. Though the area constituted by the entirety of the divided areas C1–C12 of the color-difference signals R-Y, B-Y has the same position as the area constituted by the entirety of the divided areas Y1–Y6 in the vicinity of central portion of FIG. 6A, the positions of the individual divided areas C1–C12 differ from the positions of the individual divided areas Y1–Y6. More specifically, the divided areas C1–C12 of the color-difference signals are smaller than the divided areas Y1–Y6. The reason for making the divided areas C1–C12 of the color-difference signals smaller is to obtain chromaticity information indicative of the vicinity of the central portion in greater detail.

Detection of Backlighted State and Excessively Front-lighted State

A method of discriminating the backlighted state and the excessively front-lighted state in the apparatus of this embodiment will now be described.

In order to discriminate the backlighted state and the excessively front-lighted state according to this embodiment, use is made of the difference $Y_{SUB}$ between the luminance level $Y_{AVR}$ of the peripheral portion of the subject and the luminance level $Y_{MIN}$ of the central portion of the subject, and the ratio $Y_{EV}$ of $Y_{AVR}$ to $Y_{MIN}$. Here $Y_{MIN}$ is the minimum luminance level among Y1, Y2, Y3, Y4, Y5, Y6. The relationships among these numerical values are indicated by the following equations:

$$Y_{MIN} = \mathrm{MIN}\{Y1, Y2, Y3, Y4, Y5, Y6\} \qquad (1)$$

$$Y_{AVR} = \mathrm{AVR}\{Y7, Y8, Y9, Y10\} \qquad (2)$$

$$Y_{SUB} = Y_{AVR} - Y_{MIN} \qquad (3)$$

$$Y_{EV} = Y_{AVR}/Y_{MIN} \qquad (4)$$

The backlighted state is judged to prevail if $Y_{SUM}$ and $Y_{EV}$ increase and exceed fixed threshold values, namely if the following relations hold:

$$Y_{SUB} > d_1, Y_{EV} > d_2 \qquad (5)$$

where $d_1 > 0$, $d_2 > 1$ hold. More specifically, the backlighted state is judged to prevail when the average luminance level $Y_{AVR}$ of the subject periphery is greater than the minimum luminance level $Y_{MIN}$ of the central portion of the subject. The excessively front-lighted state is judged to prevail in a case where the following relations hold:

$$Y_{SUB} < d_3, Y_{EV} < d_4 \qquad (6)$$

where $d_3 < 0$, $d_4 < 1$ hold. That is, the excessively front-lighted state is one in which the central portion is conspicuously brighter than the peripheral portion.

Exposure Correction

The control microcomputer 59 provides buffer amplifiers 70, 71 shown in FIG. 5 with the results of judging, based upon the luminance information of the divided areas Y1–Y12, whether the prevailing state is the backlighted state, the excessively front-lighted state or the normal state. The output (the aforementioned "representative luminance" of the subject) from the D/A converter 61 also is inputted to the buffer amplifiers 70, 71, which output the correction signal COR (COR') in conformity with the backlighted state or excessively front-lighted state. The correction signal COR is zero if normal photographic conditions prevail.

The correction signal COR is enters the photometer circuits 44, 46 in FIG. 4.

Figure 2:
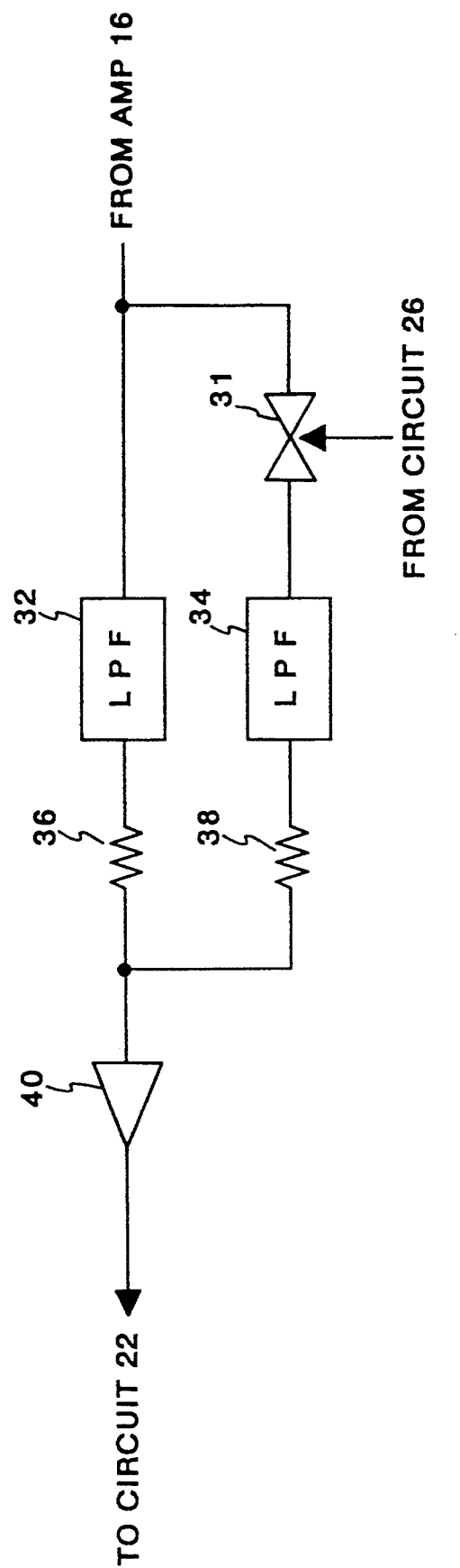
FIG. 2 is block diagram showing the construction of a photometer circuit in FIG. 1.
Figure 7:
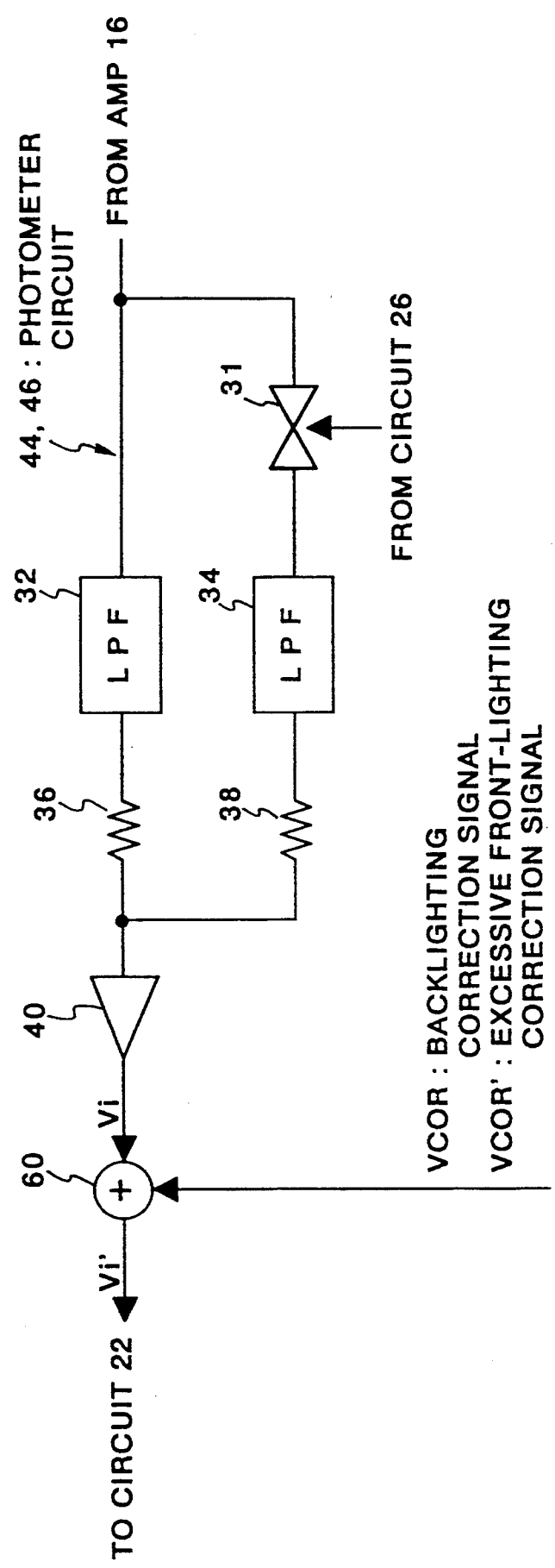
FIG. 7 is a circuit diagram showing the construction of a photometer circuit according to the embodiment.

The construction of the photometer circuit 44 is illustrated in the block diagram of FIG. 7. Since the photometer circuit 46 is identically constructed, only the photometer circuit 44 will be described. In FIG. 7, numeral 60 denotes an adder. Since the construction of the photometer circuits 44, 46 basically is similar to the construction of FIG. 2, components with functions identical to those of the components shown in FIG. 2 are designated by like reference characters. Further, let $V_{COR}$ ($V'_{COR}$) represent the correction-signal voltage from the exposure correction-signal generating circuit 42 when the backlighted state (excessively front-lighted state) prevails, let $V_i$ represent the voltage from the buffer amplifier 40, and let $V_i'$ represent the output signal from the adder 60.

When the exposure correction-signal generating circuit 42 outputs the backlighting correction signal $V_{COR}$ ($V_{COR} < V_i$), the adder 60 adds the voltage of the correction signal $VCO_R$ to the output (photometric signal) of the buffer amplifier 40. The signal $V_i'$ resulting from addition satisfies the relation $V_i' < V_i$. Since exposure control acts so as to compensate for the decline corresponding to $V_i$-$V_i'$, the video-signal level is increased, the backlighting correction is carried out and the subject is prevented from becoming too dark.

When the exposure correction-signal generating circuit 42 outputs the correction signal $V'_{COR}$ ($V'_{COR} > V_i$) for correcting excessive front-lighting, the adder 60 adds the voltage of $V'_{COR}$ to the output (photometric signal) of the buffer amplifier 40. The signal $V_i'$ resulting from addition satisfies the relation $V_i' > V_i$. Since exposure control acts so as to compensate for the increase corresponding to $V_i'$-$V_i$, the video-signal level declines and the excessive front-lighting is corrected.

Figure 8:
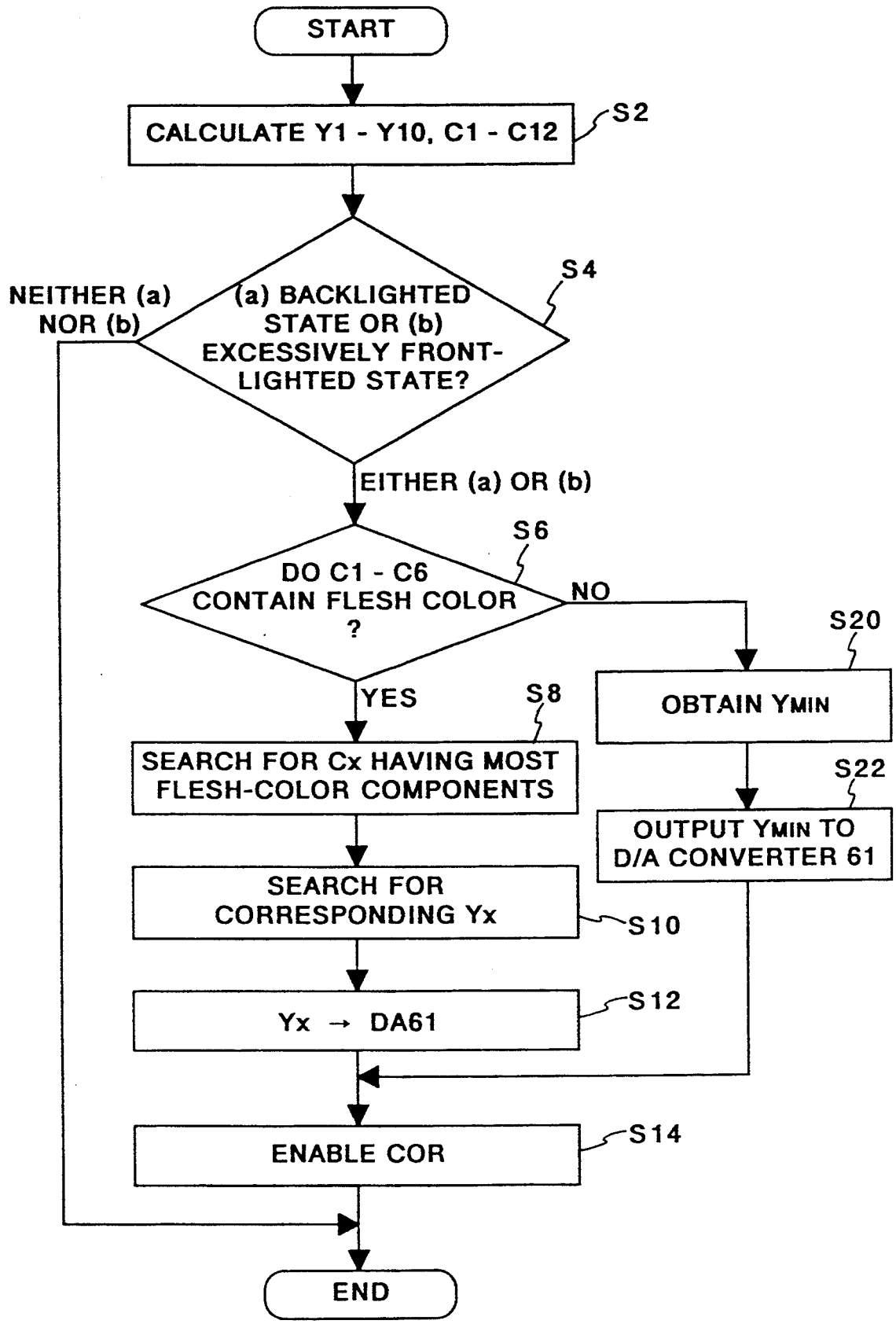
FIG. 8 is a flowchart illustrating the control procedure of the control apparatus according to the embodiment.

FIG. 8 is a control procedure for exposure-correction control executed by the microcomputer 59.

Step S2 in FIG. 8 calls for calculation of the divided areas Y1–Y10 regarding luminance, and of the divided areas C1–C12 regarding color. Next, in accordance with Eqs. (5), (6) and based upon Y1–Y10, it is determined at step S4 whether the backlighted state or excessively front-lighted state has occurred.

If the backlighted state or excessively front-lighted state has occurred, it is determined at step S6 whether any of the divided areas C1–C12 contain flesh-color components. If no flesh-color components are contained, then a divided area among the centrally located divided areas Y1–Y6 which has the minimum luminance $Y_{MIN}$ is adopted as the "representative luminance" at step S20, and $Y_{MIN}$ is outputted to the D/A converter 61 at step S22.

If any of the divided areas C1–C12 contain flesh-color components, a color-signal divided area $C_x$ containing the most flesh-color components is retrieved at step S8, and a luminance divided area $Y_x$ corresponding to the divided area $C_x$ containing the most flesh-colored components is retrieved at step S10. Next, at step S12, $Y_x$ is outputted to the D/A converter 61 as the "representative luminance".

Figure 9:
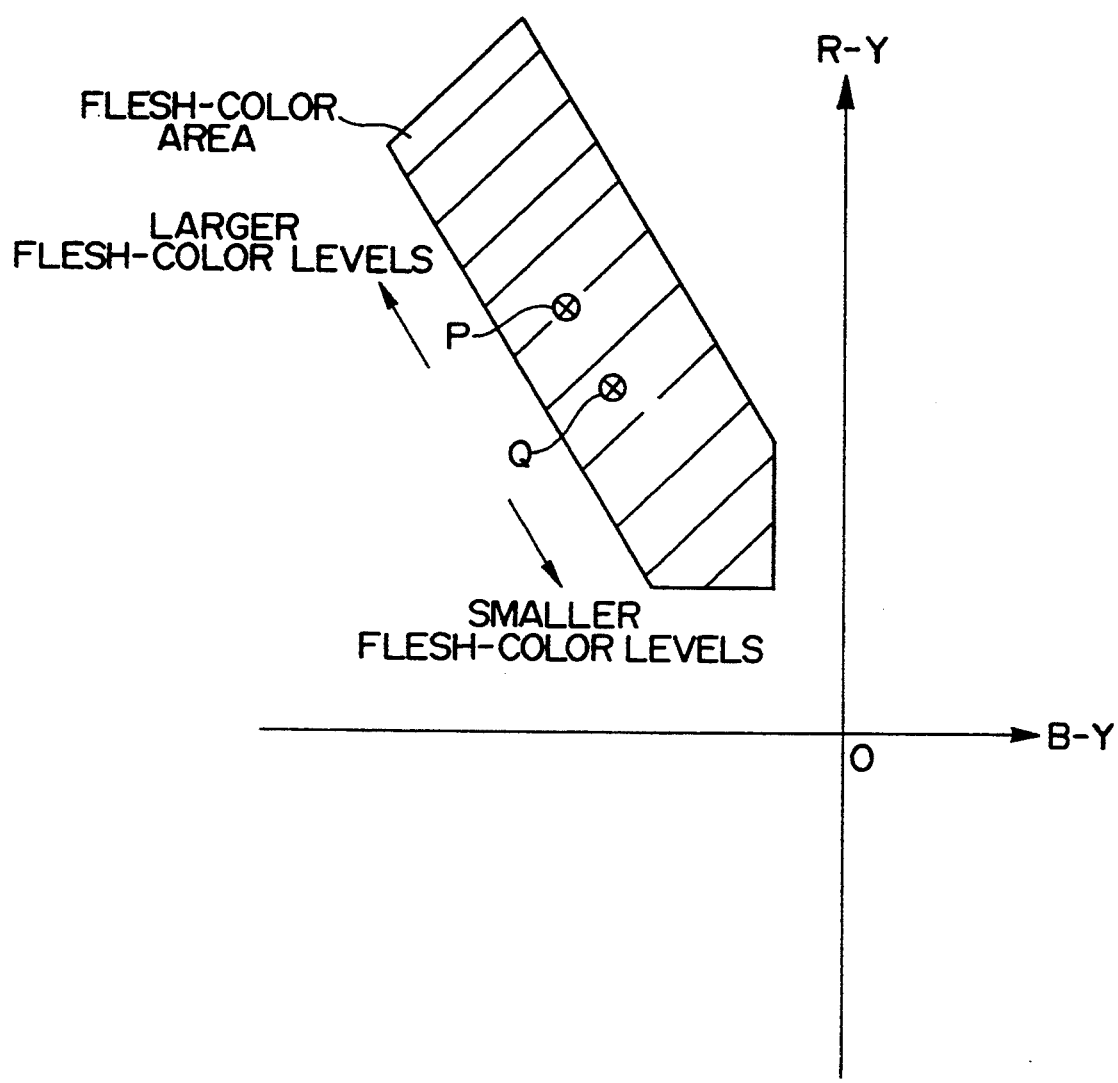
FIG. 9 is a vector diagram for illustrating a flesh-color area in the present embodiment.

The determination as to whether or not a divided area C has flesh-color components involves determining whether there is a divided area, among the divided areas C1–C12 regarding the color-difference signals, for which the values of R-Y and B-Y are related as indicated by the shaded portion in FIG. 9. If there is a divided area which satisfies the relationship shown in FIG. 9, then it is judged that this area contains the flesh color.

Specific examples shown in FIGS. 10 through 13 will be used to explain the kind of results that are obtained when the correcting circuit of FIG. 9 performs the correction control operation in accordance with the control procedure of FIG. 8.

Figure 10A:
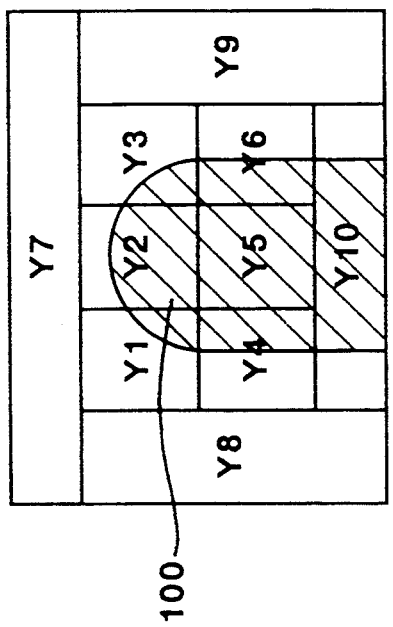
FIGS. 10A and 10B are diagrams for describing the operation of the control apparatus of this embodiment in a case where a subject which does not include a flesh color is photographed in a backlighted condition.
Figure 10B:
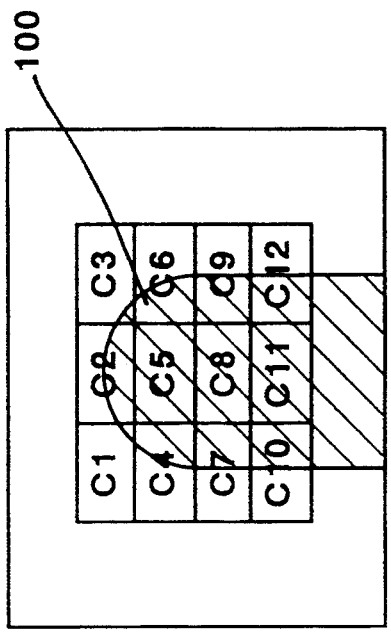

FIGS. 10A and 10B illustrate an example in which the backlighted state is judged to prevail but there are no divided areas containing the flesh color. FIG. 10A is a diagram illustrating the relationship between a subject 100 and divided areas Y1–Y10 regarding the luminance signal in a backlighted scene which does not contain the flesh color, and FIG. 10B is a diagram illustrating the relationship between the subject 100 and divided areas C1–C12 regarding the color-difference signals under conditions the same as in FIG. 10A. It is assumed here that the subject 100 does not have a very high luminance. In the case of the backlighted condition in which the color-difference signal divided areas C1–C12 do not contain the flesh color, as illustrated in FIGS. 10A and 10B, the subject 100 will not become too dark if, at step S20 in the flowchart of FIG. 8, exposure is controlled in conformity with the luminance ($=Y_{MIN}$) of the area of minimum luminance among the areas Y1–Y6 belonging to the central portion. In the example of FIG. 10A, $Y_{MIN} = Y5$ holds, and the microcomputer 59 computes the correction signal COR, which is for obtaining a corrective quantity of exposure, in conformity with the luminance of Y5. The correction signal COR is converted into an analog quantity by the D/A converter 61, and the analog quantity is delivered to the photometer circuits 44, 46. On the basis of the backlighting correction signal COR, the photometer circuit 44 controls the diaphragm 12 via the diaphragm control circuit 22, and the photometer circuit 46 controls the color-separating AGC circuit 19 to increase the quantity of incident light.

Figure 11A:
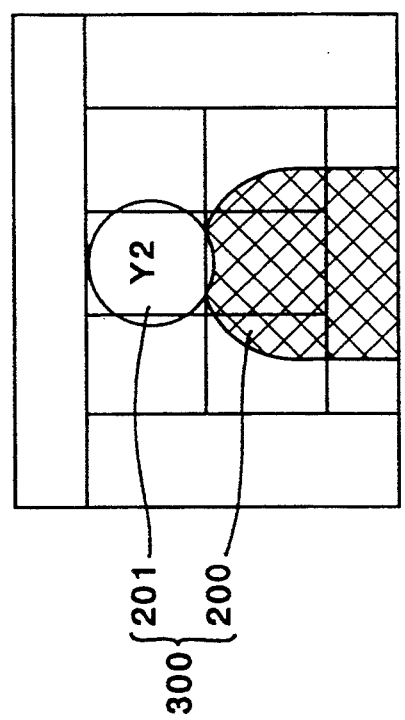
FIGS. 11A and 11B are diagrams for describing the operation of the control apparatus of this embodiment in a case where a subject which includes a flesh color is photographed in a backlighted condition.
Figure 11B:
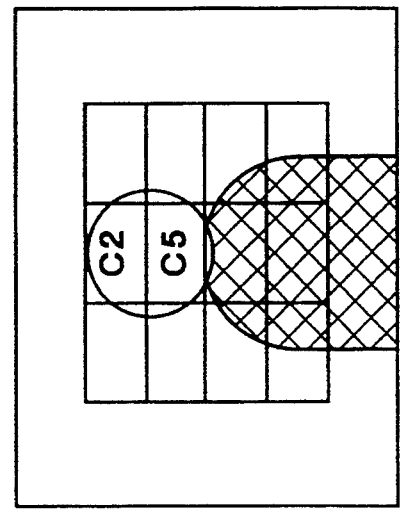

Next, FIGS. 11A and 11B will be used to explain the correction under the backlighted condition in a case where the subject contains the flesh color.

FIG. 11A is a diagram illustrating the relationship between a subject 300, which is composed of a scene containing a person 201 wearing clothing 200 having little luminance, and the divided areas Y1–Y10 regarding the luminance signal, and FIG. 11B is a diagram illustrating the relationship between the subject 300, composed of the same scene as in FIG. 11A, and divided areas C1–C12 regarding the color-difference signals. In a case where the background of the subject 300 is, say, a white wall in a scene of this kind, this may not represent very strong backlighting. However, since $Y$MIN (the luminance level of divided area Y5 is $Y$MIN in this case) becomes fairly small in comparison with the background, the values of Eqs. (3) and (4) fall under the backlighted condition. If a backlighting correction were carried out so as to render $Y$MIN (=Y5) the appropriate amount of exposure, similar to the manner described in connection with FIGS. 10A and 10B, the face (the flesh-colored portion) of the person would be over-exposed and would appear too bright and devoid of color. This is prevented in the following manner: If the flesh color is present in any of the color-difference signal divided areas C1–C12 (YES at step S6) and backlighting is judged to prevail, then the exposure correction-signal generating circuit 42 outputs the correction signal COR in such a manner that the values of the divided areas (Y1–Y6) regarding the luminance signal, which include the divided areas (C1–C12) regarding the color-difference signals in which the flesh color is present, become the appropriate exposure, as indicated in steps S8 through S12.

In the example of FIG. 11B, the face (the flesh color) of the person is present in the divided areas C1, C2, C3, C4, C5, C6, C8). In a case where the flesh-colored portion thus extends over a plurality of areas, it is so arranged that the luminance-signal divided area $Y_x$ which includes the color-difference signal divided area $C_x$ (the divided area having the maximum flesh-color level in FIG. 9) containing the greatest amount of flesh color among the divided areas becomes the optimum exposure. In FIG. 11B, the divided areas in which the flesh-color level falls within the flesh-color areas of FIG. 9 are C2 and C5. If the flesh-color levels of the respective divided areas are illustrated in FIG. 9, the value of C2 will be point Q and the value of C5 will be point P. Accordingly, since the flesh-color level is greater for point P, the exposure correction-signal generating circuit 42 generates the correction signal COR in such a manner that the value of the luminance-signal divided area Y2 containing the divided area C5 becomes the appropriate exposure.

The control method of this embodiment will now be contrasted with that of the prior art.

Figure 3A:
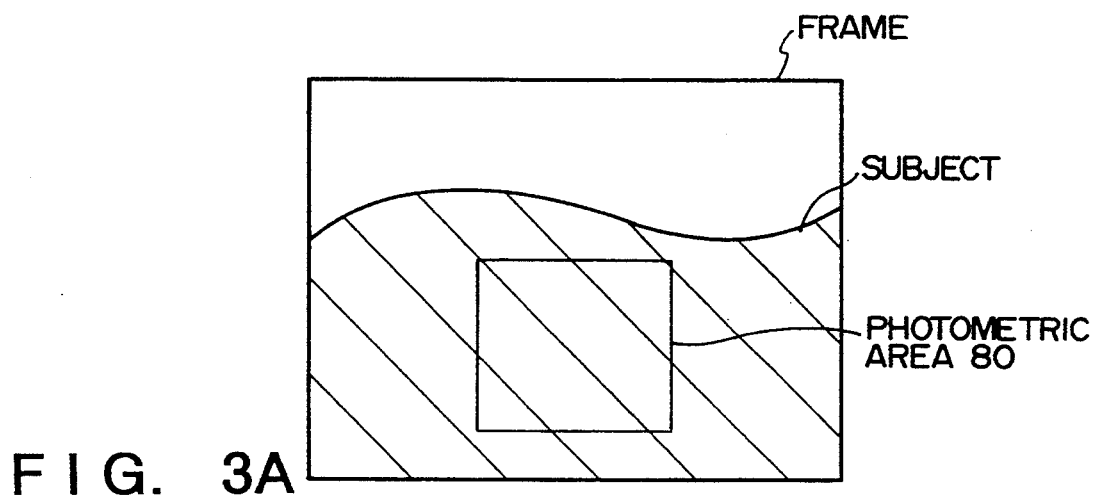
FIGS. 3A-3C are diagrams for describing the relationship between a subject and a fixed photometric area in an example of the prior art.
Figure 3B:
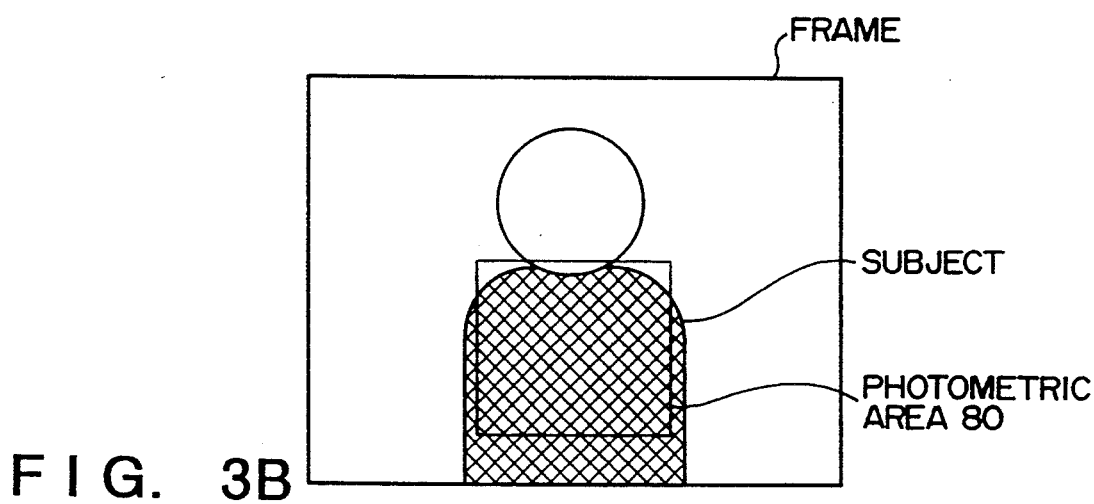
Figure 3C:
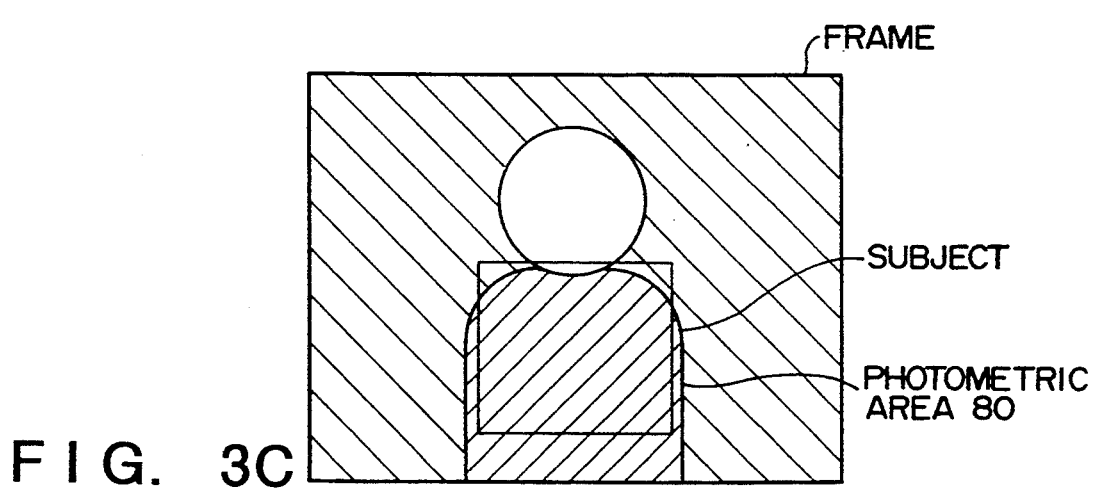

In the prior-art example of FIG. 3, preferential photometry is applied to a fixed photometric area 80 (which corresponds to the divided area Y5 of this embodiment). As a consequence, the portion corresponding to the face is over-exposed irrespective of whether a correction for backlighting is applied. The reason for this is that when the area Y5 is adopted as the representative luminance, the face portion is over-exposed even if the backlighting correction is not applied. If the backlighting correction is applied, over-exposure will result, as a matter of course. By contrast, the exposure correction-signal generating circuit 42 of this embodiment, as opposed to the conventional backlighting correction, obtains the optimum exposure by outputting a correction signal which controls the color-separating AGC circuit 19 and reduces the amount of incident light.

A comparison of the system of the present invention with the conventional average-exposure system, namely the system in which preferential photometry based upon a fixed photometric area is not carried out, reveals that whereas the portion corresponding to the face is under-exposed in the average-exposure system if no correction is applied, this problem does not arise using the method of the this embodiment.

Figure 12B:
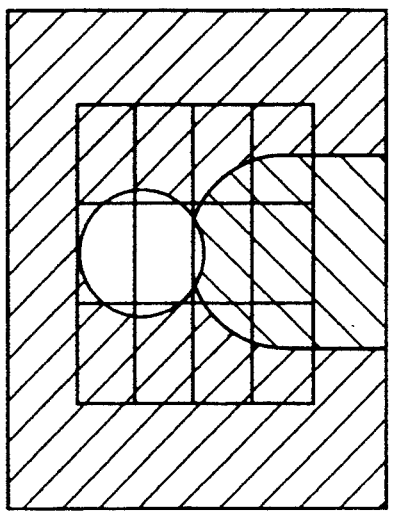
FIGS. 12A and 12B are diagrams for describing the operation of the control apparatus of this embodiment in a case where a subject which includes a flesh color is photographed in an excessively front-lighted condition.
Figure 13B:
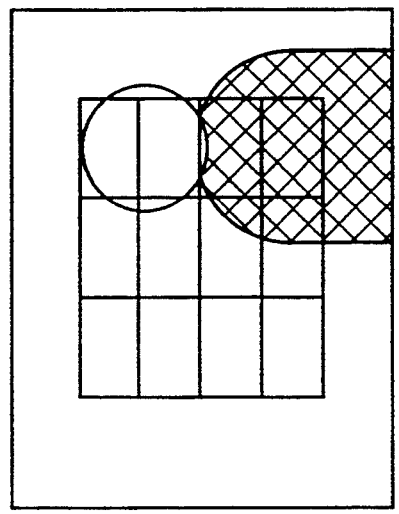
FIGS. 13A and 13B are diagrams for describing the manner in which the control apparatus of the embodiment performs control by following the movement of a moving subject.
Figure 12A:
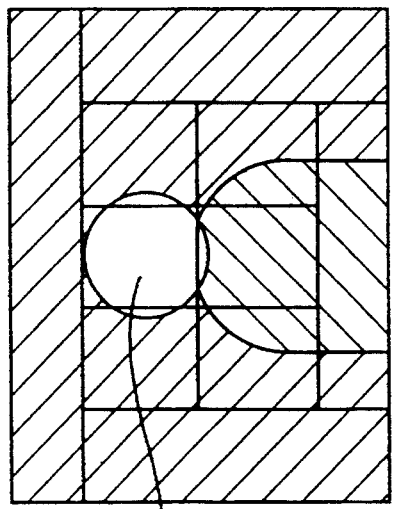

A case in which the excessively front-lighted state prevails will now be described with reference to FIGS. 12A and 12B. As illustrated in FIG. 12, the excessively front-lighted state is one in which the luminance levels of the peripheral divided areas Y7, Y8, Y9, Y10 are low and the centrally located divided areas Y1, Y2, Y3, Y4, Y5, Y6 include a luminance level which exceeds a fixed threshold value. In the example of FIG. 10A, the subject (the face 400 of a person in this case) obviously is judged to be in the excessively front-lighted state.

In the excessively front-lighted state also, the correcting circuit of this embodiment senses the presence of the flesh color in the color-difference signal divided areas (step S6). In order that the luminance level (the value of Y2 in this case) of a luminance-signal divided area which includes a color-difference signal divided area containing the flesh color will be come the appropriate exposure, the correction signal COR is outputted by the buffer amplifier 71 of FIG. 5 to control the diaphragm 12 and the color-separating AGC circuit 19 to decrease the quantity of incident light, as opposed to the backlighting correction, in which the amount of incident light is increased.

The control apparatus according to this embodiment divides a frame into a plurality of areas and retrieves, from among the divided areas, the "representative luminance" best suited for the exposure correction. By employing such a retrieval technique, exposure control according to this embodiment is effective also for application to a moving subject.

Figure 13A:
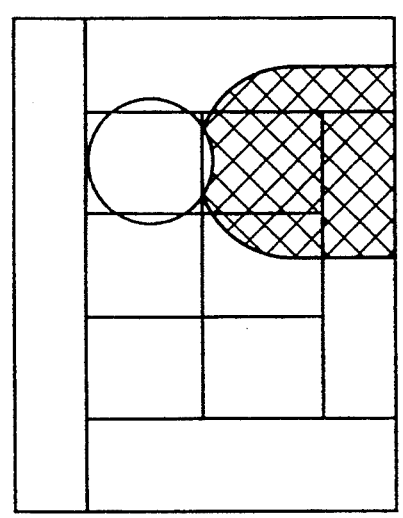

More specifically, even if the subject 400 moves so that its position in the imaged frame changes, as shown in FIG. 13A, there is a still minimum value $Y$MIN among the divided areas Y1, Y2, Y3, Y4, Y5, Y6 (the value of divided area Y6 is $Y$MIN in this case). Therefore, Y6 serves as the new "representative luminance" within the range of these divided areas, so that the subject is essentially followed to perform the backlighting correction. In addition, since a luminance-signal divided area which contains the flesh color also is one that includes a color-difference divided area in which the maximum flesh-color level is present at all times, control can be carried out in such a manner that the optimum exposure is obtained while substantially following the subject (operation in this case is such that the value of the divided area Y3 is made the appropriate exposure).

The following operation can be carried out in the same manner also with regard to a moving subject that is excessively front-lighted. For example, the maximum value $Y$MAX of the luminance levels of the luminance-signal divided areas Y1, Y2, Y3, Y4, Y5, Y6 is compared with a fixed threshold value at all times. If a divided area judged to have the the flesh color is present among the color-difference signal divided areas at this time, it will suffice to perform control in such a manner that the luminance-signal divided area which includes this color-difference signal divided area becomes the appropriate exposure.

In the present embodiment, as described above, a subject is divided into a plurality luminance-signal detection areas and color-difference signal detection areas, the levels of the luminance components and color-difference components obtained from respective ones of these areas are detected and evaluated, the backlighted state or excessively front-lighted state of the frame is discriminated while following up a change in the position of the subject, and exposure is corrected in optimum fashion. As a result, erroneous judgment does not occur, even with the preferential photometric system. In addition, since the flesh color is detected, it is possible to perform photography at the appropriate exposure even when the subject is a human being.

It should be noted that the present invention can be modified in various ways within the scope of the claims.

By way of example, though control based upon addition of voltages is performed in the arrangement of FIG. 7, it goes without saying that other methods, such as addition of currents, may be employed.

Further, though the flesh color is detected in color-difference signal detection areas in the present embodiment, the color detected need not be the flesh color in a case where emphasis is not placed upon a human being. For example, a system can be adopted in which the green of vegetation becomes the appropriate exposure by detecting the color green.

Thus, as described above, the automatic exposure control apparatus of the present invention is capable of performing appropriate exposure control conforming to the photographic circumstances, namely the condition of the subject of photography, by carried out exposure control while evaluating the luminance information and chromaticity information of the subject.

The present invention is not limited to the above embodiments and various changes and modifications can be made within the spirit and scope of the present invention. Therefore, to apprise the public of the scope of the present invention the following claims are made.

What is claimed is:

1. An automatic exposure control apparatus comprising:
    photometric means for performing photometry using a signal indicative of a photometric area set at a predetermined position within a frame;
    discriminating means for discriminating photographic conditions of a subject by detecting and evaluating levels of luminance components and levels of chromaticity components in a video signal in respective ones of a plurality of divided areas set within the frame; and
    correcting means for correcting a photometric control signal of said photometric means in dependence upon results of discrimination performed by said discriminating means.

2. The apparatus according to claim 1, wherein said correcting means retrieves one divided area, which has a chromaticity component of a predetermined level, from among the plurality of divided areas, and corrects the photometric control signal using the luminance level of the retrieved divided area as the luminance of the subject.

3. The apparatus according to claim 1, wherein said discriminating means comprises:
    first evaluating means for evaluating the lighting of the subject to determine at least whether it is in an ordinary state or an abnormal state;
    second evaluating means for evaluating the subject to determine whether it possesses a portion having a specific color; and
    means for discriminating the photographic state of the subject based upon evaluation information from said first and second evaluating means;
    wherein when it is discriminated by said discriminating means that the photographic state of the subject is a lighting state which is the abnormal state and that the subject possesses a portion having the specific color, said correcting means supplies said photometric means with correction information in such a manner that a detection area which includes the portion having the specific color becomes becomes the appropriate exposure.

4. The apparatus according to claim 3, wherein the abnormal state is a backlighted state or excessively front-lighted state.

5. The apparatus according to claim 3, wherein said specific color is a flesh color.

6. The apparatus according to claim 3, wherein said discriminating means judges whether said specific color is in the vicinity of the center of the frame.

7. The apparatus according to claim 1, wherein said discriminating means detects the level of the luminance component in a subject area within the imaged frames and in a peripheral area of the subject area based upon a distribution of the level of luminance component in the video signal, and evaluates the lighting of the subject using difference information indicative of the difference between the level of the luminance component in the subject area and the level of the luminance component in the peripheral area, and ratio information indicative of the level of the luminance component in the subject area to the level of the luminance component in the peripheral area.

8. The apparatus according to claim 1, wherein sizes of divided areas set in order to detect the levels of the chromaticity components are set to be smaller than the sizes of divided areas set in order to detect the levels of the luminance components.

9. An automatic exposure control apparatus comprising:
    imaging means for converting an image of a subject produced on an image plane into a multi-component electric signal and outputting the electric signal as an image signal;
    first detection means for detecting a predetermined signal component in the image signal;
    second detection means for detecting a luminance signal component in the image signal;
    determination means for determining a photographing condition for the image signal based on an output of said second detection means;
    photometric area setting means for setting a photometric area within the image frame based on the outputs of said first detection means and said determination means; and
    exposure control means for performing an exposure control based on the luminance signal component of the image signal which exists within the photometric area set by said photometric area setting means.

10. The apparatus according to claim 9, wherein the predetermined signal component comprises color signal information of the image signal.

11. The apparatus according to claim 10, wherein said second detection means detects a luminance level of the image signal.

12. The apparatus according to claim 11, wherein said first detection means discriminates an area having predetermined color signal information from a plurality of areas within the image frame divided in accordance with a first pattern.

13. The apparatus according to claim 12, wherein if said first detection means cannot detect an area in which the predetermined color signal information exists, said photometric area setting means sets a photometric area a luminance level of which is the lowest among the areas divided in accordance with the second pattern.

14. The apparatus according to claim 13, wherein said exposure control means performs an exposure control by controlling a diaphragm of the imaging means and changing a gain of the control so that an appropriate luminance level within the photometric area can be obtained.

15. The apparatus according to claim 12, wherein said photometric area setting means designated to set a photometric area from a plurality of areas within the image frame divided in accordance with a second pattern, said photometric area including the area detected by said first detection means out of which the predetermined color signal information has been detected.

16. The apparatus according to claim 15, wherein said exposure control means performs an exposure control by controlling a diaphragm of the imaging means and a changing a gain of the control so that an appropriate luminance level with in the photometric area can be obtained.

17. The apparatus according to claim 15, wherein the first pattern is finer than the second pattern.

18. An automatic exposure control apparatus comprising:
first division means for dividing an image frame into a first plurality of areas in accordance with a first pattern, each area including an image signal;
second division means for dividing the frame into a second plurality of areas in accordance with a second pattern, each area including an image signal;
first discrimination means for discriminating a state of the frame based on a luminance signal component of the image signals of the first plurality of areas;
second discrimination means for discriminating an area out of which a predetermined signal component is detected from the second plurality of areas;
photometric area designating means for designating a photometric area from the first plurality of areas based on the discrimination results of at least said first discrimination means; and
exposure control means for performing an exposure control based on the image signal of the photometric area designated by said photometric area designating means.

19. The apparatus according to claim 18, wherein the first discrimination means detects a luminance level of an image of a subject produced on the frame.

20. The apparatus according to claim 19, wherein said first discrimination means discriminates whether, the frame is normal, back-lighted, or excessively front-lighted, based on the respective luminance signals of the first plurality of areas.

21. The apparatus according to claim 18, wherein the predetermined signal component is color signal information of the image of the subject produced on the frame.

22. The apparatus according to claim 21, wherein the color signal information is color information related to a human being.

23. The apparatus according to claim 18, wherein, if the state of the frame is discriminated to be either back-lighted or excessively front-lighted by said first discrimination means, said photometric area designating means selects the photometric area based on the discrimination results by said second discrimination means.

24. The apparatus according to claim 23, wherein, if said second discrimination means cannot discriminate an area out of which the predetermined signal component is detected, said photometric area designated means selects the photometric area based on the discrimination results by said first discrimination means.

25. The apparatus according to claim 24, wherein, if said second discrimination means cannot discriminate an area out of which the predetermined signal component is detected, said photometric area designating means selects a photometric area the luminance level of which is the lowest among the first plurality of areas based on the discrimination results by said first discrimination means.

26. An imaging apparatus comprising:
imaging means for converting an image of a subject produced on an image frame into an electric signal and outputting the electric signal as an image signal;
first detection means for detecting a luminance signal component from the image signals of a first plurality of areas within the frame divided in accordance with a first pattern;
second detection means for detecting a predetermined signal component from the image signals of a second plurality of areas of the frame divided in accordance with a second pattern; and
control means for setting a detection area within the frame based on outputs of said first and second detection means.

27. The apparatus according to claim 26, wherein said first detection means detects a luminance level of image signal obtained by the imaging means.

28. The apparatus according to claim 27, wherein said second detection means detects a predetermined color signal information in an image signal obtained by the imaging means.

29. The apparatus according to claim 28, wherein, if the detection area based on the output of said second detection means cannot be set, said control means sets the detection area based on the output of said first detection means.

30. The apparatus according to claim 29, wherein, in a case where said first detection means detects the state of the image frame and where the detected state of the frame is back-lighted or excessively front-lighted, said control means designates an area in which the predetermined color signal information exists based on the output of said second detection means and sets the detection area in the designated area, while if said second detection means cannot designate an area in which the predetermined color signal information exists, said control means sets an area where the luminance level is the lowest among the first plurality of areas based on the output of said first detection means, as a detection area.

31. The apparatus according to claim 27, wherein said control means discriminates a state of the image frame based on the output of said first detection means, and in response sets the detection area using the output of said second detection means.

32. The apparatus according to claim 26, wherein the detection area is a photometric area.

33. An imaging apparatus comprising:
  imaging means for converting an image of a subject produced in an image frame into an electric signal and outputting the electric signal as an image signal; area division means for dividing the frame into a plurality of areas;
  discriminating means for discriminating luminance signal information and color signal information in the image signal in the areas; and
  correction means for correcting the exposure based on the output of said discriminating means, wherein the output is based on luminance signal information and color signal information in the image signal.

34. The apparatus according to claim 33, wherein said area division means divides the image frame into a first plurality of areas in accordance with a first pattern, and wherein said discriminating means discriminates luminance levels of the respective areas and discriminates the state of the frame on the basis of the discriminated levels.

35. The apparatus according to claim 34, wherein said division means divides the frame into a second plurality of areas in accordance with a second pattern, and wherein said discriminating means discriminates an area in which the predetermined color signal information exists.

36. The apparatus according to claim 35, wherein, if the frame is discriminated as back-lighted or excessively front-lighted, said discriminating means sets the discriminated area in which the predetermined color signal information exists as an exposure correction area, and if said discriminating means cannot discriminate an area in which the predetermined color signal information exists, and discriminating means sets an area where the luminance level is the lowest among the second plurality of areas as an exposure correction area.

37. The apparatus according to claim 36, said correction means includes a control means for controlling a diaphragm and gain of the imaging means, and corrects an exposure so that the exposure correction area can be appropriately exposed.

38. A video camera apparatus comprising:
  imaging means for converting an image of a subject produced on an image frame into a multi-component electric signal and outputting the electric signal as an image signal;
  first detection means for detecting a luminance signal component in the image signal;
  second detection means for detecting a predetermined signal component in the image signal;
  photometric area setting means for setting a photometric area within the image frame based on the outputs of said first detection means and said second detection means; and
  exposure control means for performing an exposure control based on a luminance signal component in the image signal which exists within the photometric area set by said photometric area setting means.

39. The apparatus according to claim 38, wherein said second detection means detects a color signal out of the image signal.

40. The apparatus according to claim 38, further comprising determination means for determining a photographing condition for the image signal on the basis of an output of said first detection means.

41. The apparatus according to claim 40, wherein said image frame is divided into a plurality of areas, and wherein said first detection means detects a luminance level of a luminance signal within each area.

42. The apparatus according to claim 41, wherein said image frame is divided into a plurality of areas, and wherein said second detection means detects a level of a color signal within each area.

43. The apparatus according to claim 42, wherein said determination means determines whether a photographing condition for the image signal is normal, back-lighted, or excessively front-lighted.

44. The apparatus according to claim 43, wherein when the photographing condition is back-lighted or excessively front-lighted, said photometric area setting means sets the photometric area based on the output of said second detection means.

45. The apparatus according to claim 38, wherein said exposure control means controls the diaphragm or gain of the apparatus so that a proper exposure condition is obtained.

* * * * *

UNITED STATES PATENT AND TRADEMARK OFFICE
CERTIFICATE OF CORRECTION

PATENT NO. : 5,353,058
DATED : October 4, 1994
INVENTOR(S) : Hirofumi Takei

It is certified that error appears in the above-indentified patent and that said Letters Patent is hereby corrected as shown below:

Title Page:
[56] REFERENCES CITED:

"4,987,482   6/1991   Imai et al." should read
--4,987,482   1/1991   Imai et al.--.

COLUMN 2:

Line 35, "to" should read --too--.
Line 39, "the only" should read --only--.

COLUMN 7:

Line 35, "is" should be deleted.
Line 55, "signal $VCO_R$" should read --signal $V_{COR}$--.

COLUMN 10:

Line 34, "be come" should read --become--.

UNITED STATES PATENT AND TRADEMARK OFFICE
CERTIFICATE OF CORRECTION

PATENT NO. : 5,353,058
DATED : October 4, 1994
INVENTOR(S) : Hirofumi Takei

It is certified that error appears in the above-indentified patent and that said Letters Patent is hereby corrected as shown below:

COLUMN 12:

Line 21, "be-" should be deleted.
Line 22, "comes" should be deleted.
Line 33, "frames" should read --frame--.
Line 52, "plane" should read --frame--.

COLUMN 13:

Line 35, "and a" should read --and--.
Line 37, "with in" should read --within--.

Signed and Sealed this

Twenty-eight Day of March, 1995

Attest:

BRUCE LEHMAN

Attesting Officer    Commissioner of Patents and Trademarks